US011699348B2

(12) United States Patent
Crist

(10) Patent No.: US 11,699,348 B2
(45) Date of Patent: *Jul. 11, 2023

(54) AIR TRAFFIC TOLLING SYSTEM

(71) Applicant: Class G Incorporated, Irvington, KY (US)

(72) Inventor: Jason J. Crist, Irvington, KY (US)

(73) Assignee: Class G Incorporated, Irvington, KY (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/883,030

(22) Filed: May 26, 2020

(65) Prior Publication Data

US 2020/0294322 A1    Sep. 17, 2020

Related U.S. Application Data

(63) Continuation of application No. 16/523,406, filed on Jul. 26, 2019, now Pat. No. 10,665,038.

(60) Provisional application No. 62/711,133, filed on Jul. 27, 2018.

(51) Int. Cl.
G08G 5/00 (2006.01)
G07B 15/00 (2011.01)
H04N 23/60 (2023.01)
G06F 18/22 (2023.01)
B64U 10/00 (2023.01)

(52) U.S. Cl.
CPC ........... *G08G 5/0013* (2013.01); *G07B 15/00* (2013.01); *H04N 23/60* (2023.01); *B64U 10/00* (2023.01); *B64U 2201/104* (2023.01); *G06F 18/22* (2023.01)

(58) Field of Classification Search
USPC ........................................... 701/23
See application file for complete search history.

(56) References Cited

U.S. PATENT DOCUMENTS

| | | | |
|---|---|---|---|
| 5,819,234 A * | 10/1998 | Slavin | G06Q 30/0284 235/375 |
| 6,987,452 B2 | 1/2006 | Yang | |
| 9,087,451 B1 | 7/2015 | Jarrell | |
| 9,211,025 B1 | 12/2015 | Elhawwashy | |
| 9,466,218 B2 | 10/2016 | Jarrell | |
| 9,508,264 B2 | 11/2016 | Chan et al. | |
| 9,691,285 B2 | 6/2017 | Jarrell | |
| 9,754,496 B2 | 9/2017 | Chan et al. | |
| 9,811,796 B2 | 11/2017 | Ogilvie et al. | |
| 9,833,097 B2 | 12/2017 | Byers et al. | |
| 10,665,038 B2 * | 5/2020 | Crist | H04N 5/232 |

(Continued)

FOREIGN PATENT DOCUMENTS

WO    WO-2022107619 A1 *    5/2022

OTHER PUBLICATIONS

International Searching Authority, International Search Report and Written Opinion for PCT/US2019/043662 dated Oct. 21, 2019, 14 pages.

*Primary Examiner* — Tyler D Paige
(74) *Attorney, Agent, or Firm* — Dinsmore & Shohl LLP

(57) ABSTRACT

Systems and methods are provided for managing air traffic and tolling for a plurality of unmanned aircraft system. Various embodiments include terrestrial and unmanned aircraft system based tracking modules for tracking a plurality of unmanned aircraft systems and reporting flight data to a tolling entity for collection from operators.

19 Claims, 6 Drawing Sheets

(56) References Cited

U.S. PATENT DOCUMENTS

| | | |
|---|---|---|
| 2009/0005901 A1 | 1/2009 | Stemmle et al. |
| 2011/0161140 A1* | 6/2011 | Polt .......................... B60R 1/12 |
| | | 348/148 |
| 2015/0158599 A1 | 6/2015 | Sisko |
| 2016/0117929 A1 | 4/2016 | Chan et al. |
| 2016/0117931 A1 | 4/2016 | Chan |
| 2016/0117933 A1* | 4/2016 | Chan .................... G08G 5/0069 |
| | | 705/317 |
| 2016/0157653 A1 | 6/2016 | Manitta |
| 2016/0163204 A1 | 6/2016 | Raptopoulos |
| 2016/0225264 A1 | 8/2016 | Taveira |
| 2016/0253907 A1* | 9/2016 | Taveira .................. G08G 5/006 |
| | | 701/3 |
| 2016/0275801 A1 | 9/2016 | Kopardekar |
| 2017/0018184 A1 | 1/2017 | Northrup |
| 2017/0069214 A1 | 3/2017 | Dupray |
| 2017/0073085 A1 | 3/2017 | Tremblay et al. |
| 2017/0076600 A1 | 3/2017 | Nakfour |
| 2017/0091710 A1 | 3/2017 | Van Dyke |
| 2017/0121021 A1 | 5/2017 | Bonazzoli et al. |
| 2017/0286892 A1 | 10/2017 | Studnicka |
| 2017/0286905 A1 | 10/2017 | Richardson et al. |
| 2017/0287341 A1 | 10/2017 | Jarrell |
| 2017/0301220 A1 | 10/2017 | Jarrell et al. |
| 2018/0016027 A1 | 1/2018 | Cheatham, III et al. |
| 2018/0044018 A1 | 2/2018 | Bonazzoli et al. |
| 2018/0049575 A1 | 2/2018 | Yamrick |
| 2018/0049576 A1 | 2/2018 | Byers et al. |
| 2018/0065759 A1 | 3/2018 | Michalski et al. |
| 2018/0114450 A1 | 4/2018 | Glaab |
| 2019/0340876 A1* | 11/2019 | Northrup ............ G07F 17/3241 |
| 2019/0375503 A1 | 12/2019 | Maxwell et al. |

* cited by examiner

AIR TRAFFIC TOLLING SYSTEM

FIELD OF THE INVENTION

The system and apparatus is related generally to a system for tracking and monitoring air traffic. More specifically, the system described herein is a smart system for tracking, monitoring, and interacting with a plurality of unmanned UASs and providing flight data for tolling to an approved governmental entity.

BACKGROUND OF THE INVENTION

The ubiquitous availability of unmanned UASs, commonly referred to as "drones" or "UAV's" has resulted in an exponential growth of drone air traffic throughout many parts of the world. With the advent of lighter more efficient batteries and power systems and advanced UAS control systems it has become economically feasible to utilize UASs for many tasks, particularly the routing and delivery of small packages.

Due to this proliferation of UAS air traffic existing air traffic control systems are overburdened and have proven incapable of handling the tracking and routing of many small UASs, particularly in more populous areas and high air traffic corridors. Air traffic control for UASs will become more and more necessary as their use expands since the greater volume of air traffic will cause potential UAS collisions as well as potential passenger plane collisions with UASs.

Accordingly, governmental entities have undertaken to begin design and installation of a variety of air traffic control systems in order to manage the voluminous UAS traffic. For example, in the United States the Federal Aviation Administration is currently studying the implementation of an expanded and integrated air traffic control system for UASs and the potential collection of tolls required to fund the operation of these systems. As a result of these new systems, many governments are considering implementation of UAS tolling systems to collect funds from commercial UAS operators in order to fund the enhanced air traffic control systems required to direct the air traffic. Furthermore, relevant UAS governing bodies have begun a system of registration for UAS operators. For example, the Federal Aviation Administration in the United States currently requires all UAS's to be registered and to have a remote pilot certificate.

Tolling systems can take the form of per flight tolls, or tolls proportioned by trip length, or even payload tolls. However, there is currently no available system or method for systematically tracking UASs and reporting their flights to a toll collecting entity in order to collect the tolls.

Accordingly, there is a need in the art for systems and methods of tracking and managing the operation of UASs or drones that enables as user to track a plurality of UASs and report the details of their flight operations to a central entity, for example a governmental agency such as the FAA in order to levy and collect operational tolls.

SUMMARY OF THE INVENTION

This disclosure is directed generally to systems, methods and apparatus that provide for the tracking of a plurality of unmanned UASs or unmanned aircraft systems, hereinafter UAVs, UASs, or drones. The system provides the capability of tracking a plurality of UASs, monitoring flight data for each, and communicating the flight data of each to a tolling entity for collection and further processing.

In some embodiments, the systems and methods described herein may each include one or more of the following features. In exemplary but non-limiting embodiments the invention includes a plurality of UAS modules secured to a plurality of UASs or drones, and concomitant terrestrial modules secured or situated at a plurality of locations. The UAS modules and terrestrial modules are capable of wireless communication with each other, and with other networks, such as wireless internet communications, and further are both equipped with proximity sensors such that terrestrial modules may detect the presence of nearby UASs and vice versa.

Furthermore, the system disclosed herein provides a method of collecting flight data from each of the UASs by terrestrial modules, and transmitting that flight data, via terrestrial modules, to a toll collecting entity. In some aspects and embodiments UAS flight data such as global position, altitude, vehicle identification or serial number, and even vehicle payload may be transmitted from UASs and their modules to terrestrial modules.

In accordance with further embodiments and aspects of the invention terrestrial modules may be equipped with cameras to photograph detected UASs and confirm or verify their identity and flight path by comparing a photographed tail number to a transmitted identifier.

As used herein for the purposes of this disclosure the terms "unmanned aerial vehicle", "unmanned aircraft system", "UAV", "UAS" and "drone" are all synonymous and used to refer to any type of aerial aircraft system that can be flown, either remotely or directly, for the purposes of any type of commerce or leisure activity.

As used herein for purposes of the present disclosure, the term "wireless communication" generally describes apparatus and systems relating to the wireless transmission of a signal. Any of a wide variety of wireless transmission devices and communications protocols may be employed in the system of the invention, including analog and digital transmission systems. Exemplary but non-limiting wireless transmitters that may form a part of the invention include radio transmitters, cellular transmitters, LTE and LTE advanced systems, ZigBee™, Wi-Fi, and Bluetooth transmitters. Additionally, a plurality of wireless network and transmission systems may be employed without departing from the scope of the invention, including, but not limited to, wireless personal area networks, local area networks, mesh networks, metropolitan area and global area networks.

The term "processor" or alternatively "controller" is used herein generally to describe various apparatus relating to the operation of one or more computers, web servers, or databases. A processor can be implemented in numerous ways (e.g., such as with dedicated hardware) to perform various functions discussed herein. A "processor" is one example of a controller which employs one or more microprocessors that may be programmed using software instructions (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" or "instructions" are used herein in a generic sense to refer to any type of computer code (e.g., software or microcode) that can be employed to program one or more processors or controllers.

The term "user interface" as used herein refers to an interface between a user or operator and one or more devices that enables interaction between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), smartphones, watches, tablets, personal computing platforms, touch screens, microphones and other types of sensors that may receive some form of human-generated stimulus and generate a signal in response thereto. Furthermore, user interfaces can encompass interactive web pages and other user prompts, whether provided on stand alone computing platforms or mobile devices.

The term "communications link" is generally meant to include in digital or other communication with any other part of the system via a wireless or wired communication protocol. A communication link may be between two devices or components and may be accomplished by a separate networking system. Communication links may be provided to transfer data between a web server, a database, a computer, a mobile or handheld device, or any other control system, a consumer operated external device, a wireless local area network (WLAN), or any other communication system. The communication links disclosed and described in this specification may be integrated within various system components or alternatively may be separate electronic systems.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description only and should not be regarded as limiting.

The accompanying drawings, which are incorporated and form a part of the specification illustrate exemplary, but non-limiting, embodiments of the disclosure, and together with the description, serve to explain the principles of the disclosure.

Those skilled in the art will appreciate that the inventive concepts and principles upon which the disclosure is based may readily be utilized as a basis for designing other structures, systems, methods, and articles of manufacture for implementing the purposes of the present disclosure. Accordingly, the claims appended hereto should be construed to include such equivalent constructions without departing from the spirit and scope of the invention herein disclosed.

BRIEF DESCRIPTION OF THE DRAWING FIGURES

DETAILED DESCRIPTION OF EXEMPLARY EMBODIMENTS

Figure 1:
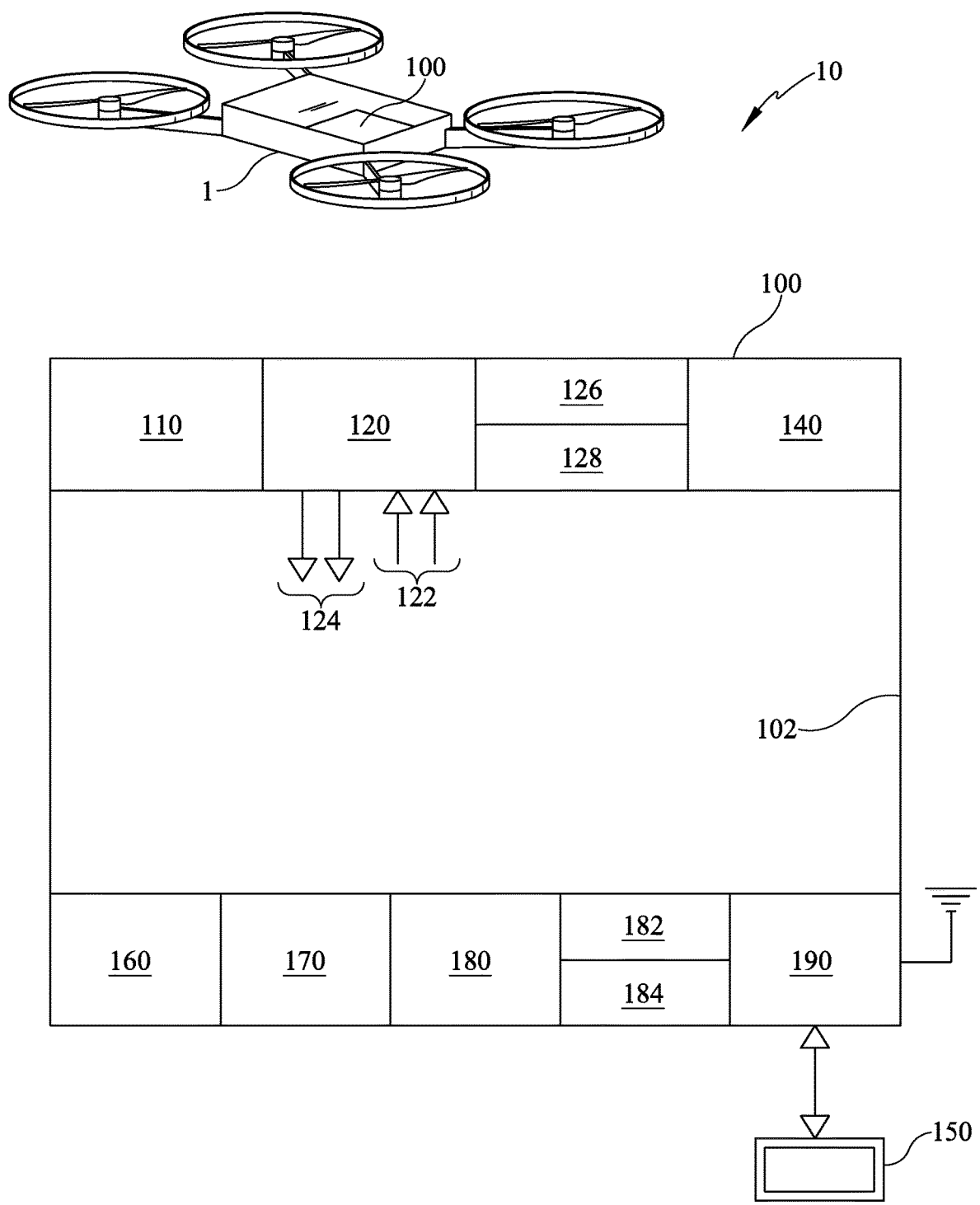
FIG. 1 illustrates a block diagram of an unmanned aircraft system module system for implementing certain embodiments and features of the present disclosure.
Figure 2:
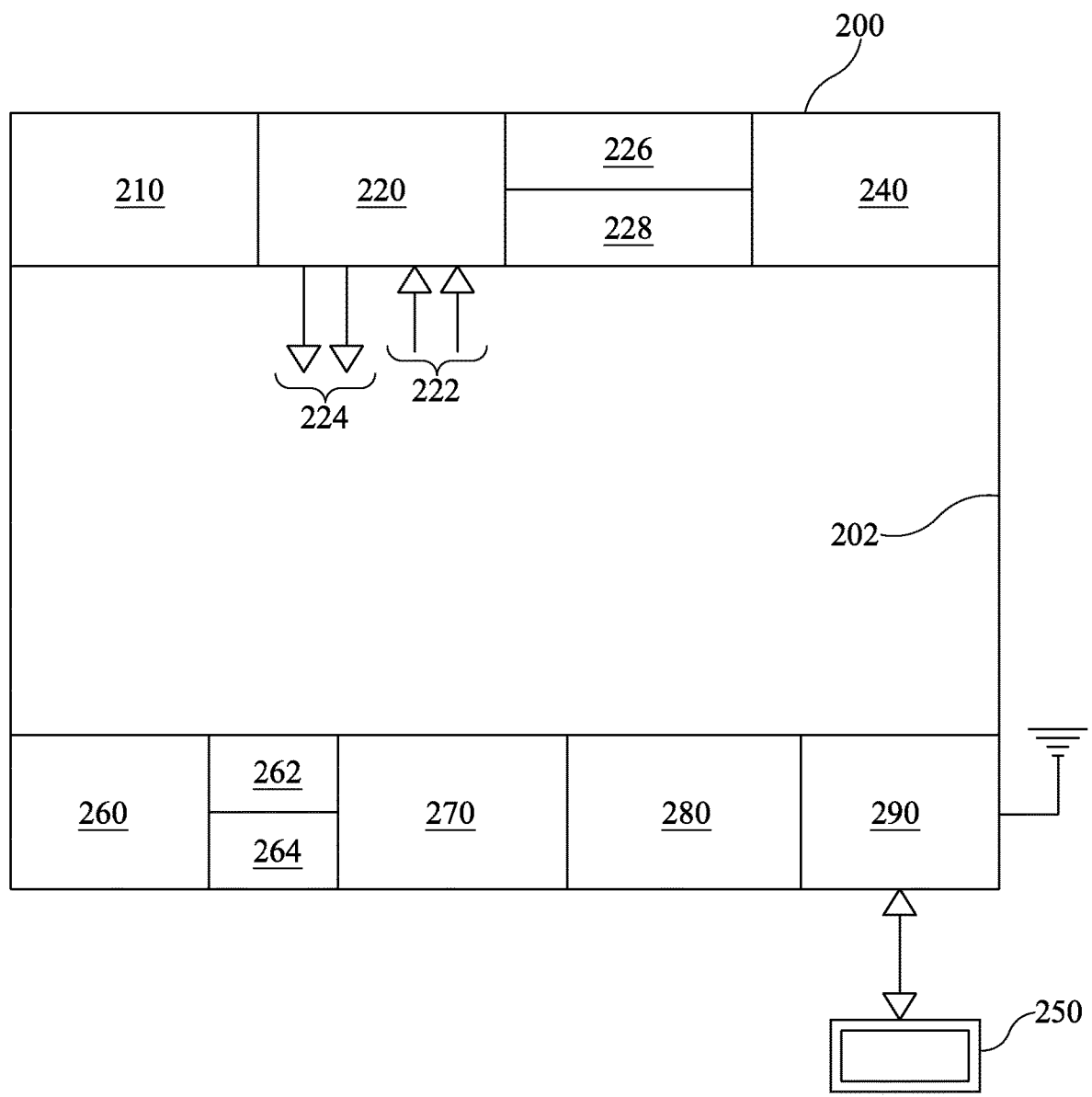
FIG. 2 illustrates a block diagram of an unmanned aircraft system module for implementing certain embodiments and features of the present disclosure.

Reference will now be made in detail to the various embodiments of the invention, certain non-limiting examples of which are illustrated in the accompanying drawing Figures.

In various aspects and embodiments, and referring generally to FIGS. 1-8 an air vehicle tolling and tracking system 10 for managing, monitoring, and tracking for unmanned aircraft systems 1 (hereinafter UAS's or UAV's) includes a UAS module 100 that is secured to or mounted in or on a UAS and a terrestrial module 200 that may be mounted in a plurality of locations as discussed in detail herein below. UAS module 100 and T module 200 are capable of communicating wirelessly with each other and with an air traffic toll collection system 300, which may include a database and concomitant memory for storing information such as flight data that is related to the operation of all UAS's flown in a predetermined or defined time frame and/or geographical area. It should be noted that tracking system 10 is capable of tracking and monitoring any flying apparatus that includes a UAS module 100 and at least one T module 200.

Referring now to FIG. 1 and in accordance with various embodiments UAS module 100 may comprise a compact, lightweight, waterproof enclosure 102 for securing and mounting the various components of UAS module 100. Furthermore, UAS module 100 may include a power supply 110 or equivalent source of electrical power, for example a rechargeable battery, for operation of the various components of module 100. In some aspects and embodiments power to operate UAS module 100 may be supplied by UAS 1, for example through a shared power bus or the like. In these embodiments UAS module 100 power supply 110 may operate as a back-up power source, to be utilized in the event of a low power occurrence or power failure of UAS 1. Furthermore, UAS module 100 may include a processor or controller 120 for storing and executing a plurality of programmed instructions capable of carrying out the various functions of the UAS module 100 and concomitant system 10 disclosed herein. The processor 120 may include a concomitant memory that stores the programmed instruction set provided thereto, as well as various flight data recorded during operation. The processor 120 may be any hardware device capable of executing instructions stored in memory or data storage or otherwise processing data. As such, processor 120 may include a microprocessor, field programmable gate array (FPGA), application-specific integrated circuit (ASIC), or other similar devices.

In various embodiments processor 120 may be a microcontroller having a plurality of electrical signal inputs 122 and outputs 124 that may be operatively coupled to various components of UAS module 100 described herein. The plurality of signal inputs 122 and outputs 124 are capable of being operatively coupled to various electrical components that generate and receive electrical signals representative of flight data, such as altitude and global positioning data, as will be discussed further herein below. Processors 120 may include concomitant data storage memory 126, both RAM and ROM, and further may also be operatively coupled to additional storage memory 128 for storing and using data acquired during operation of system 10. Memory 126 can include a number of separate memories including a main random access memory (RAM) for storage of instructions and data during processor 120 operation and a read only memory (ROM) in which fixed instructions may be stored. The memory 126 may include various memories such as, for example L1, L2, or L3 cache or system memory. As such, the memory 126 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

In various aspects of the invention system 10 includes a user interface 140 that may include a display screen or screens that are provided to a user, or alternatively a touch sensitive screen, a plurality of buttons or option selector switches, a keypad, a detachable keyboard and/or mouse, or a touch sensitive pad to enable a user to configure UAS module 100 and system 10 for use and to access system 10 attributes via processor 120. User interfaces 140 may further include a speaker or audible alarm to alert or notify a user of certain prompts or actions. One of ordinary skill in the art will recognize that a wide variety of user interfaces may be employed in conjunction with the exemplary embodiments disclosed herein without departing from the scope of the invention.

In various aspects and embodiments of the invention, a user interface 140 may be provided as a series of displays provided through a web browser interface, although various non-limiting user interfaces 140 may be employed without departing from the scope of the invention. Furthermore, in some embodiments and implementations a handheld or mobile computing device 150 may also be provided in data communication with secure network to provide a user the ability to access and interact with UAS module 100 and system 10 remotely. Exemplary but non-limiting mobile devices 150 include smartphones, tablet computers, smart watches, and other devices capable of internet access utilizing a web browser or similar tools.

Furthermore, in some embodiments and implementations UAS module 100 may include a global positioning system (GPS) 160 that is operatively coupled to controller 120 and is capable of providing a signal representative of the relative location of module 100 and thus the UAS 1 on which it is secured, either continuously or at predetermined times throughout a flight. Global positioning system 160 may be provided with a unique serial number identifier that can be used to track and identify UAS 1 and further may include an output representative of position operatively coupled to input 122 of the processor 120, which then is provided with suitable instructions to store altitude data for UAS 1 in memory 126. GPS 160 further enables a governmental entity, for example the FAA in the United States, to monitor and track each UAS 1 to assure that there are no violations of no-fly areas or other unauthorized use. For example, if a UAS 1 flies within five miles of an airport, the FAA could take action against the operator or owner based on data provided by GPS 160.

In some implementations and embodiments module 100 may further include an altimeter 170 that monitors the altitude of module 100 relative to the ground, and thus monitors the altitude of UAS 1. Altimeter 170 may include an output representative of altitude operatively coupled to an input 122 of processor 120 such that processor may periodically store altitude data for UAS 1 in memory 126 for future reporting, as will be discussed in detail herein below. In some aspects, when UAS 1 is determined to have exceeded an allowable mandated altitude, this event data is recorded for reporting to a governing entity.

Additionally, and in accordance with some aspects of the invention UAS module 100 may include a proximity sensor 180, for example an LTE sensor, for determining the proximity of a concomitant sensor 180 mounted on a T module 200, as will be discussed further herein below. In some embodiments proximity sensor 180 may include an accelerometer 182 and a three-dimensional magnetometer 184 to determine proximity to a nearby T module 200, by determining UAS module 100 exact location. In either embodiment proximity sensor 180 may include an output that is operatively coupled to an input 122 of processor 120 to indicate to processor 120 that a T module 200 is nearby. In these embodiments when a UAS module 100 and T module 200 are within a predetermined range of each other, data from UAS module 100 is transmitted to T module 200 as discussed further below.

In other embodiments and aspects UAS module 100 may further include a communications receiver and transmitter 190 for wirelessly receiving and transmitting various signals and data as required to operate system 10 and communicate and transfer data to T modules 200. Wireless receiver and transmitter 190 may operate utilizing a one of many known wireless communications protocols such as Bluetooth, BLE, ZigBee, various LAN protocols, Z-Wave, Thread, WiFi, 2G, 3G, 4G, 5G, LTE, NB-IoT, RFID, and all other equivalent communications protocols capable of wireless transmission of a specified data packet without departing from the scope of the invention.

In some embodiments a UAS 1 vehicle identification or serial number and/or UAS 1 vehicle tail number is advantageously stored in memory 126 so that it can be transmitted when required, or when a UAS 1 module 100 is detected by terrestrial module 200. In various aspects the UAS module 100 is securely mounted or secured to an UAS 1 so that it transmits flight data to system 10.

Referring again to drawing FIGS. 2-4, and in accordance with certain embodiments, system 10 further includes a plurality of terrestrial modules 200, or T modules 200. It should be noted that a plurality of terrestrial modules 200 may be located at a plurality of locations throughout a flight corridor or geographical area, and may further be mounted in locations that enable wireless communications between UAS modules 100 and terrestrial modules 200. In some non-limiting embodiments terrestrial modules 200 may be located on light poles 4, cell towers, buildings 3, and any other fixed structure that enables and facilitates wireless communications.

In various embodiments terrestrial module 200 may comprise a compact, lightweight, waterproof enclosure 202 for securing and mounting the various components of T module 200. Furthermore, T module 200 may include a power supply 210 or a similar source of electrical power, for example a rechargeable battery, for operation of the components of module 200. In some aspects power to operate T module 200 may be supplied by a power supply located on the structure or device on which T module 200 is situated. For example, power for T module 200 may be supplied from an electrical source or transformer mounted on a light pole 4, cell tower, building 3, or similar structure. In these embodiments T module 200 power supply 210 may operate as a back-up power source, to be utilized in the event of a low power occurrence or power failure. Furthermore, T module 200 may include a processor or controller 220 for storing and executing a plurality of programmed instructions capable of carrying out the various functions of the T module 200 and concomitant system 10 disclosed herein. The processor 220 may include a concomitant memory that stores the programmed instruction set provided thereto, as well as various flight data recorded during operation. The processor 220 may be any hardware device capable of executing instructions stored in memory or data storage or otherwise processing data. As such, processor 220 may include a microprocessor, field programmable gate array (FPGA), application-specific integrated circuit (ASIC), or other similar devices.

In some embodiments processor 220 may be a microcontroller having a plurality of electrical signal inputs 222 and outputs 224 that may be operatively coupled to various components of T module 200. The plurality of signal inputs 222 and outputs 224 are capable of being operatively coupled to various electrical components that generate and receive electrical signals representative of flight data, such as altitude and global positioning data. Processors 220 may include concomitant data storage memory 226, both RAM and ROM, and further may also be operatively coupled to additional storage memory 228 for storing and using data acquired during operation of system 10. Memory 226 can include a number of separate memories including a main random access memory (RAM) for storage of instructions and data during processor 220 operation and a read only memory (ROM) in which fixed instructions may be stored.

Memory 226 may include various memories such as, for example L1, L2, or L3 cache or system memory. As such, memory 226 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

In various aspects of the invention T module 200 may include a user interface 240 that may include a display screen or screens that are provided to a user, or alternatively a touch sensitive screen, a plurality of buttons or option selector switches, a keypad, a detachable keyboard and/or mouse, or a touch sensitive pad to enable a user to configure T module 200 and system 10 for use and to access system 10 attributes via processor 220. User interfaces 240 may further include a speaker or audible alarm to alert or notify a user of certain prompts or actions. A wide variety of user interfaces may be employed in conjunction with the exemplary embodiments disclosed herein without departing from the scope of the invention.

In various aspects and embodiments of the invention, a user interface 240 may be provided as a series of displays provided through a web browser interface, although various non-limiting user interfaces 240 may be employed without departing from the scope of the invention. Furthermore, in some embodiments and implementations a handheld or mobile computing device 250 may also be provided in data communication with secure network to provide a user the ability to access and interact with T module 200 and system 10 remotely. Some examples of mobile devices 250 may include smartphones, tablet computers, smart watches, and other devices capable of internet access utilizing a web browser or similar tools.

Additionally, and in accordance with some aspects of the invention T module 200 may include a proximity sensor 260, for example an LTE sensor, for determining the proximity of a concomitant sensor 180 mounted on a UAS module 100. In some embodiments proximity sensor 260 may include an accelerometer 262 and a three-dimensional magnetometer 264 to determine proximity to a nearby UAS module 100. In either embodiment proximity sensor 260 may include an output that is operatively coupled to an input 222 of processor 220 to indicate to processor 220 that a UAS module 100 is nearby. In these embodiments when a UAS module 100 and T module 200 are within a predetermined range of each other, data from UAS module 100 is transmitted to T module 200 as discussed further below.

In other embodiments and aspects T module 200 may further include a communications receiver and transmitter 290 for wirelessly receiving and transmitting various signals and data as required to operate system 10. Similar to receiver 190 of UAS module 100, wireless receiver and transmitter 290 may operate utilizing a one of many known wireless communications protocols such as Bluetooth, BLE, ZigBee, various LAN protocols, Z-Wave, Thread, WiFi, 2G, 3G, 4G, 5G, LTE, NB-IoT, RFID, and all other equivalent communications protocols capable of wireless transmission of a specified data packet without departing from the scope of the invention.

Additionally, and in accordance with some embodiments T module 200 may include a camera 280, having outputs and inputs operatively coupled to the inputs 222 and outputs 224 of the processor 210. Embodiments of T module 200 having a camera 280 are suitable for use in areas such as warehouses or base stations, for example a building or business where drone traffic originates or terminates. In these embodiments camera 280 takes a picture of a nearby UAS 1 when proximity sensor 260 detects its presence. This feature of the invention enables each terrestrial module 200 to confirm the identity of a passing UAS 1, thereby assisting in tracking the UAS 1 throughout a flight.

Figure 8:
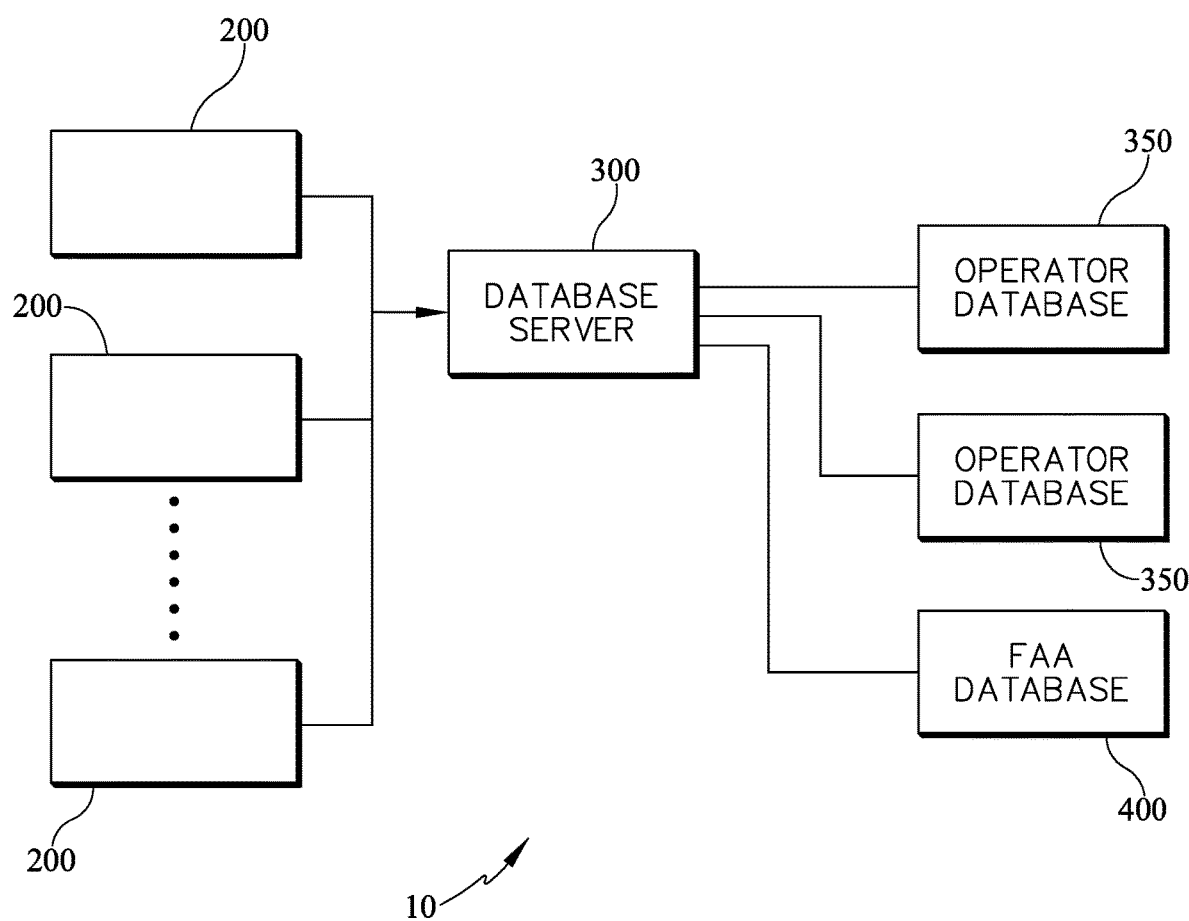
FIG. 8 illustrates a block diagram of an exemplary data management system for implementing certain embodiments and features of the present disclosure.

Referring to FIG. 8, and in accordance with some aspects and embodiments of the invention a database 300 is provided for collecting, storing, and routing information related to UAS 1 flights to a toll collecting entity, for example a governmental agency that tracks and registers UAS's 1, such as the Federal Aviation Administration (FAA). Database 300 may reside in server, or a plurality thereof and may be centrally located or simply stored in the cloud in one of many known data storage systems. In many aspects and embodiments exemplary types of data that may be collected and stored in database 300 by system 10 related to each UAS 1 include, but is not limited to, GPS sensor identifier or serial number, UAS 1 location, UAS 1 altitude, a time and date stamp indicating when the data was recorded, UAS 1 operator or ownership information, a photographic image of each UAS 1, and UAS 1 tail or registration number.

In some embodiments database 300 communicates relevant UAS 1 information to a toll collecting entity, for example the FAA, as well as UAS 1 operators or owners. Database 300 may communicate collected data to an operator database 350 for individual operators, and provide all data to an FAA database 400 so that tolls can be collected from the registered UAS 1 operators. Furthermore, and in some aspects and embodiments, database 300 may be utilized to generate periodic tolling bills or invoices to various operators and to a relevant governing body, such that the operators are aware of any amounts due to the governing body and may submit them in a timely fashion.

Figure 3:
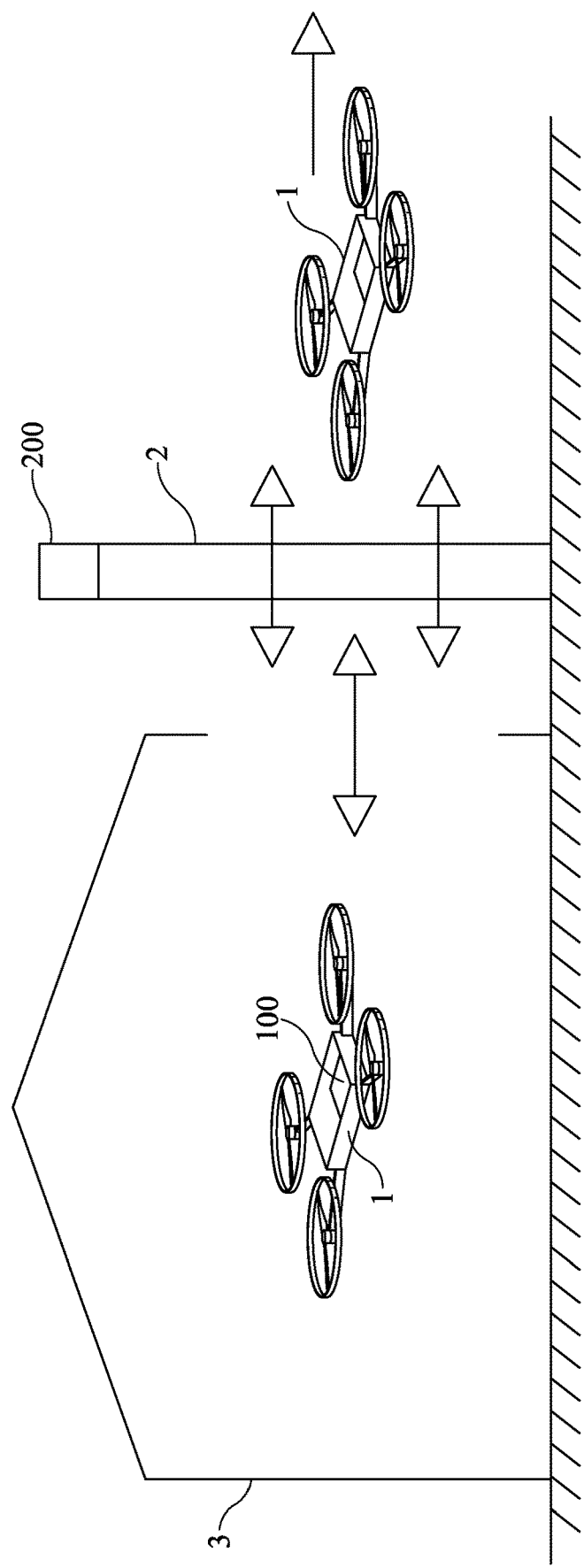
FIG. 3 illustrates an exemplary system for implementing certain embodiments and features of the present disclosure.
Figure 4:
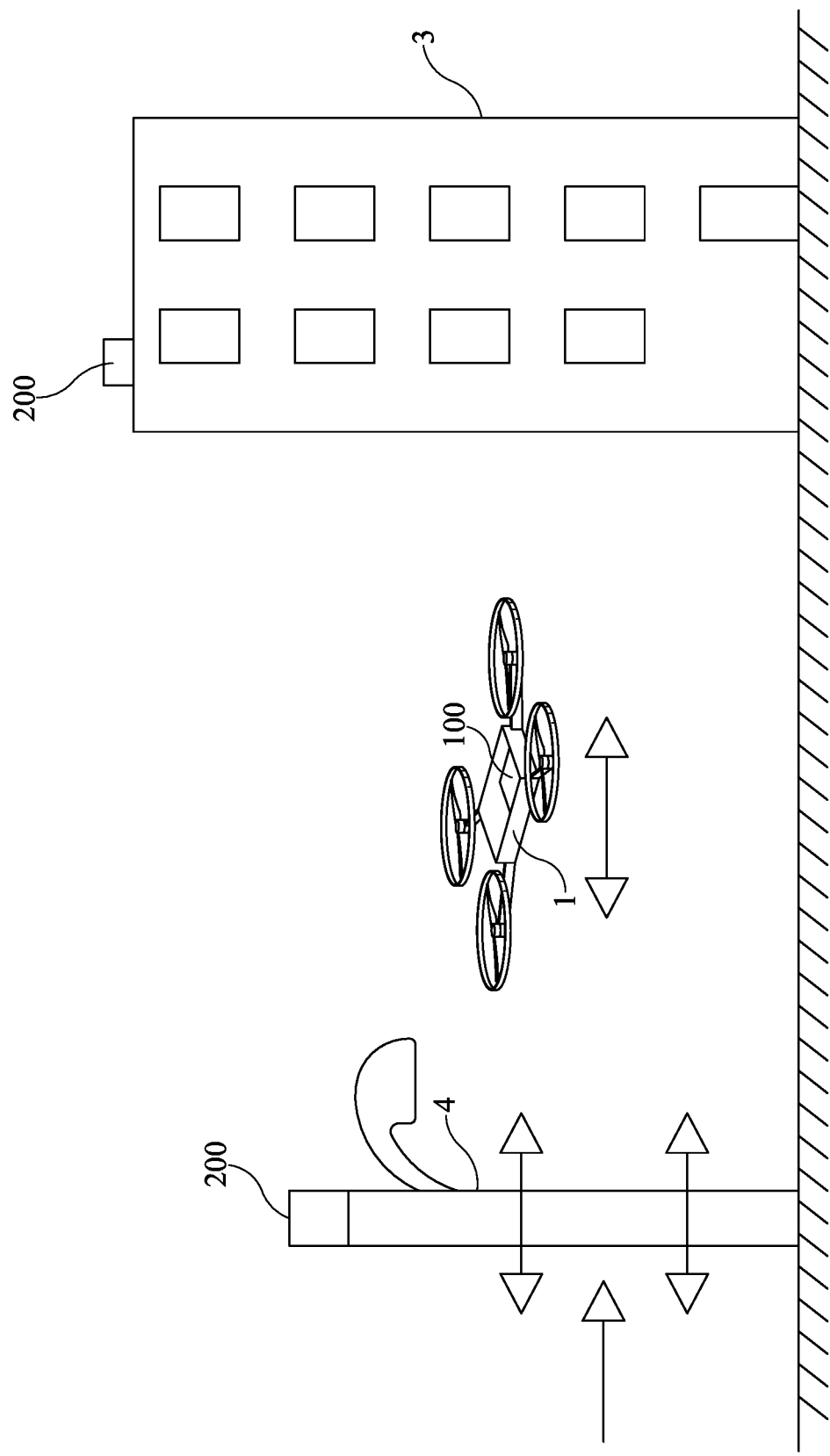
FIG. 4 illustrates an exemplary system for implementing certain embodiments and features of the present disclosure.

Referring to FIGS. 3 and 4 in some embodiments T modules can be advantageously located proximate a UAS 1 staging facility 3, such as a shipping warehouse or building. In these embodiments a T module or modules 200 can be secured or positioned at a point proximate the exit to the facility 3, for example secured to a pole 2 or similar structure. Additionally, T modules 200 may be positioned on buildings 3 or other elevated structures such as light poles 4 proximate a defined UAS 1 flight corridor or route such that all UAS's 1 passing proximate these T modules 200 may communicate with and be tracked thereby. In some embodiments a T module 200 that is situated proximate a facility 3 may be connected to the internet via Bluetooth, LAN, or any other wireless network. In this fashion data may be transferred from a base T module to database 300 for further dissemination.

Figure 5:
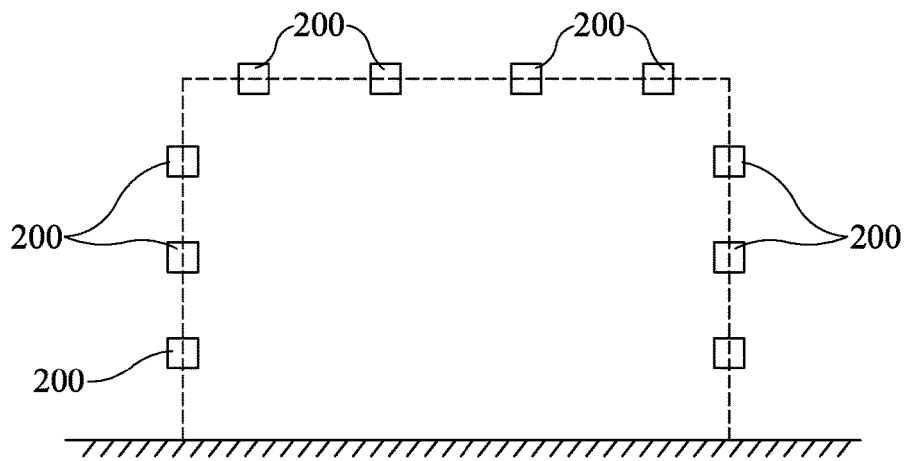
FIG. 5 illustrates an exemplary system for implementing certain embodiments and features of the present disclosure.
Figure 6:
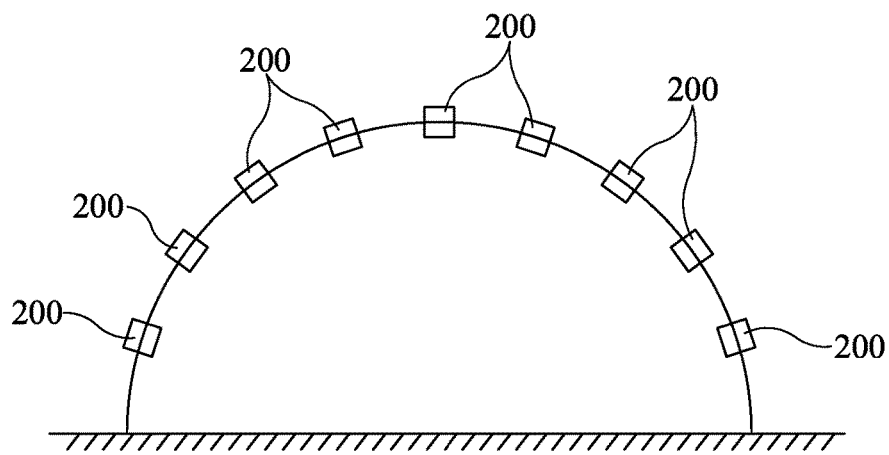
FIG. 6 illustrates an exemplary system for implementing certain embodiments and features of the present disclosure.
Figure 7:
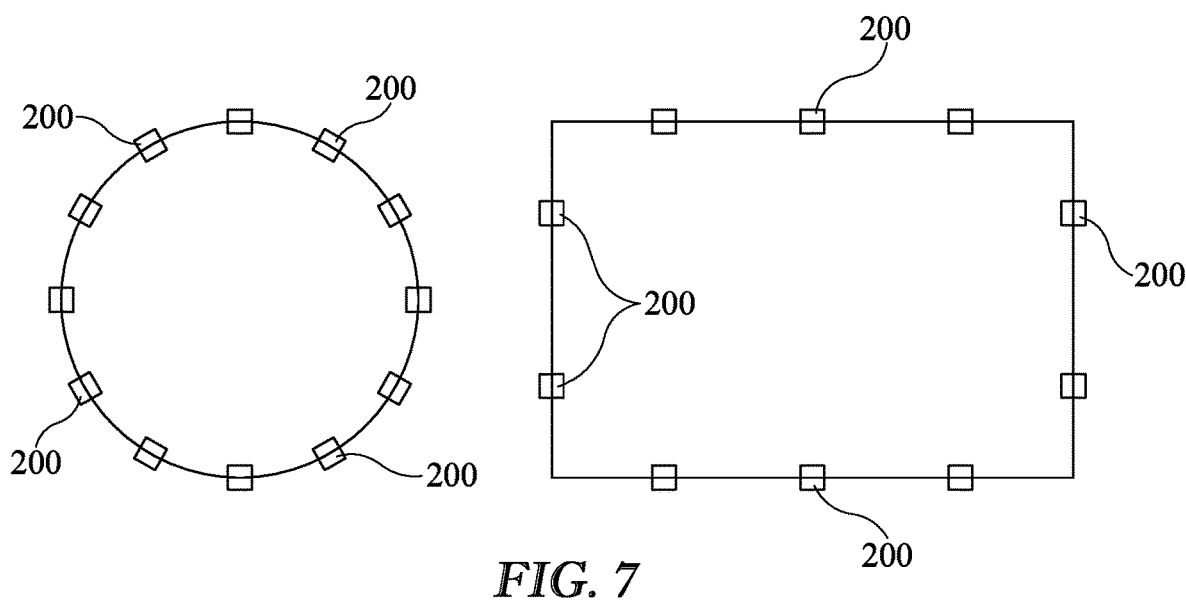
FIG. 7 illustrates an exemplary system for implementing certain embodiments and features of the present disclosure.

Referring now to FIGS. 5-7 in other aspects and embodiments the system 10 of the present invention operates to track a plurality of UASs 1 by monitoring and tracking their flight paths between a T module 200 situated proximate the UAS 1 flight origin, and a plurality of T modules 200 situated or located along flight corridors. In some aspects T modules 200 may be positioned along a plurality of defined flight paths or travel corridors specified by a governing entity for UAS 1 travel and commerce. In many locales and large metropolitan areas a wide array of T modules may be provided to track and record flight data from all registered UAS's 1 utilizing the flight corridors.

FIGS. 6 and 7 depict an arrangement of a plurality of T modules 200 that may be located proximate the entrance/exit to warehouse 3 or equivalent structure in which UAS 1 flights originate. These T modules 200 may be called base T modules 200 and are used to collect and record all pertinent information from each UAS 1 flight at its origin and transmit this data to database 300. Furthermore, T modules 200 proximate a UAS 1 flight origination point may be equipped with camera 280 and take a picture of each UAS 1 exiting a structure 3. In some embodiments as seen in FIG. 8 a plurality of T modules 200 may be positioned or secured to an air vehicle, such as a blimp, or a train car or similar conveyance.

In one non-limiting example both UAS 100 modules and T modules 200 are provided with suitable programming instructions in their processors 120, 220 to allow them to continuously monitor proximity sensors 180 to detect the presence of a nearby UAS 1. Alternatively, or in combination, a passing UAS module 100 may continuously transmit its identifying information such that a nearby terrestrial module 200 may detect its presence. Once detected, the terrestrial module 200 receives and stores flight data from each passing UAS 1 module 100 that is stored in database 300, and then sent or transmitted to a toll collecting entity database 400.

In some aspects and embodiments terrestrial modules 200 may utilize camera 280 take a photograph of each detected UAS module 100 that verifies its identification by matching or comparing its photographed tail number with the serial number and/or tail number provided by wireless transmission from module 100. By collecting a photographic image of each passing UAS 1 that specific vehicle's flight path may be confirmed for systems wherein tolling is based on flight distance.

In other aspects and embodiments a passing UAS 1 module 100 will transmit to each detected terrestrial module 200 its flight data, including but not limited to its vehicle serial number and/or tail number, its global positioning system coordinates at the time of transmission, and its current altitude. This data can then in turn be transmitted by terrestrial modules 200 to a toll collecting entity for further processing. In some aspects and embodiments the flight data for a specified UAS 1 may be transmitted to a toll collecting entity continuously as the vehicle 1 travels along its path. In other non-limiting aspects and embodiments the flight data may be stored in module memory beginning at the initiation of a UAS 1 flight, for example when the UAS 1 module 100 is first detected by a terrestrial module 200, and then transmitted when the flight is complete, for example when the altitude of UAS 1 is once again at ground level, or a predetermined altitude, or global positioning coordinate.

In some embodiments when a UAS 1 module 100 departs the range of a base T module 200 it will collect and record all the flight data mentioned herein above until it is once again within range of another T module 200, or alternatively a base T module again. Each T module will receive the updated information transmitted from UAS 1 module 100 when it passes within range of T module 200. T module 200 will then transmit the information received from the passing UAS to database 300 where it will be stored as discussed herein above.

Upon return to a base facility 3 from its flight a UAS 1 module 100 will transmit the information it has recorded while in flight to a base T module 200. The entirety of flight information will be stored on the UAS 1 module 100 until it has completed its flight. Once the base T module has received all the flight data from a UAS 1 and updated the cloud database 300, the UAS 1 module 100 memory 126 can be erased to provide space for the next flight. The base T module 200 will also in some embodiments take a photograph of the UAS 1 returning. The pre-flight photograph, post flight photograph, and flight information gathered from the plurality of T modules 200 during the trip will be updated on the cloud database 300 to document the flight. This information can all be stored in database 300 according the serial/tail number of the UAS 1.

As can be seen by the foregoing, a plurality of terrestrial modules 200 may be employed to track and store flight data for a plurality of UASs 1 equipped with UAS modules 100, and then transmit that data to a toll collecting entity database 400 for further processing.

Other embodiments of the disclosure will be apparent to those skilled in the art from consideration of the specification and practice of the embodiments disclosed herein. It is intended that the specification and examples be considered as exemplary only, with a true scope and spirit of the invention and exemplary embodiments being indicated by the following claims.

I claim:

1. A system for managing tolling for aircraft systems and transmitting flight data to a toll collecting entity comprising:
    an aircraft system module comprising;
        a processor having a concomitant memory device that stores a set of instructions and stores flight data relevant to said aircraft system;
        a global positioning system for determining the location of said aircraft system at predetermined intervals and the proximity of a proximal terrestrial module;
        an altimeter for monitoring the altitude of said aircraft system;
        a communications receiver and transmitter for transmitting and receiving said flight data; and
    a terrestrial module comprising;
        a processor having a concomitant memory device that stores a set of instructions and stores said flight data relevant to said aircraft system;
        a communications receiver and transmitter for transmitting and receiving said flight data and for receiving notification of the presence of a proximal aircraft system;
        a camera for capturing an image of proximal aircraft systems; and
        wherein the instructions for said terrestrial module processor cause said processor to take and store a photograph of each aircraft system at a point where said aircraft system is proximal each terrestrial module and calculate a total distance travelled for each detected aircraft system and transmit said total distance to the toll collecting entity.

2. The system of claim 1, wherein the instructions for said terrestrial module processor cause said processor to:
    detect the presence of said proximal aircraft system by receiving an identifying transmission from said proximal aircraft system;
    receive and store in memory flight data from each aircraft system;
    transmit said flight data from each aircraft system to the toll collecting entity.

3. The system of claim 2 further comprising:
    a plurality of terrestrial modules spaced at predetermined locations for monitoring aircraft systems.

4. The system of claim 3 wherein the flight data of each aircraft system comprises:
    an aircraft system serial number or tail number;
    a global positioning system location at each point where said aircraft system is proximal each terrestrial module;
    an altitude of said aircraft system at each point where said aircraft system is proximal each terrestrial module.

5. The system of claim 4 wherein the instructions for said terrestrial module processor-cause said processor to:
    take a photograph of each aircraft system at a point where said aircraft system flight originates.

6. The system of claim 5 wherein said flight data is transmitted to said toll collecting entity each time an aircraft system is detected by a terrestrial module.

7. The system of claim 5 wherein said flight data is transmitted to said toll collecting entity each time an aircraft system finishes a flight.

8. The system of claim 4 wherein the flight data of each aircraft system comprises:
    the time each photograph is taken each time an aircraft system is detected by a terrestrial module; and
    the total elapsed time for each flight of an aircraft system.

9. The system of claim 1 wherein said aircraft system module comprises:
    a three-dimensional magnetometer for determining the speed of the aircraft.

10. A system for managing tolling for aircraft systems comprising:
    an aircraft system module having a processor having a concomitant memory for storing a set of instructions and flight data relevant to said aircraft system, a global positioning system for determining the location of said aircraft system at predetermined intervals, said location being stored in said memory, an altimeter for monitoring the altitude of said aircraft system at predetermined intervals and storing said altitude in said memory, a communications receiver and transmitter for transmitting and receiving said flight data, and a global positioning system sensor for determining the proximity of a proximal terrestrial module;
    a terrestrial module having a processor having a concomitant memory that stores said flight data relevant to said aircraft system, a communications receiver and transmitter for transmitting and receiving said flight data, and a camera for capturing an image of proximal aircraft systems;
    wherein said camera captures and stores a photograph of each aircraft system at a point where said aircraft system is positioned proximal to said terrestrial module; and
    wherein said processor calculates a total distance travelled and total time travelled for each detected aircraft system and transmits said total distance and said total time travelled to a toll collecting entity.

11. The system of claim 10 wherein said processor calculates an average speed of each aircraft system.

12. The system of claim 10 comprising:
    a power supply for supplying said terrestrial module with power.

13. The system of claim 10 wherein said flight data comprises:
    a plurality of locations of said aircraft system, including at least the locations at the origin and termination of its flight;
    at least one altitude of said aircraft system at its highest point as measured by said altimeter;
    a vehicle registration number;
    a plurality of time stamps, including at least one time at the origin and termination of a flight; and
    a vehicle tail number.

14. The system of claim 13 wherein said aircraft system module transmits said flight data to a terrestrial module whenever proximity thereto is detected by said aircraft system.

15. The system of claim 14 wherein said aircraft system module transmits said flight data to a terrestrial module at the termination of a flight.

16. The system of claim 15 wherein said terrestrial module transmits said flight data to a database after the termination of a flight.

17. The system of claim 16 wherein said flight data is supplied to a governing entity database for toll determination and collection.

18. The system of claim 17 wherein said system determines a toll amount for a specified aircraft system flight and transmits said toll amount to an operator and a governing entity.

19. The system of claim 10 wherein said aircraft system module comprises:

a user interface for displaying said total distance travelled, total time travelled, and a calculated toll at the end of each flight.

\* \* \* \* \*